(12) United States Patent
Sheshadri et al.

(10) Patent No.: US 12,543,019 B2
(45) Date of Patent: Feb. 3, 2026

(54) REALIZING ENTERPRISE-GRADE LOCALIZATION USING WiFi 802.11mc FINE TUNE MEASUREMENT

(71) Applicant: NEC Laboratories America, Inc., Princeton, NJ (US)

(72) Inventors: Ramanujan Sheshadri, Jersey City, NJ (US); Karthikeyan Sundaresan, Manalapan, NJ (US); Shivang Aggarwal, San Jose, CA (US)

(73) Assignee: NEC Corporation (JP)

( * ) Notice: Subject to any disclaimer, the term of this patent is extended or adjusted under 35 U.S.C. 154(b) by 339 days.

(21) Appl. No.: 18/182,713

(22) Filed: Mar. 13, 2023

(65) Prior Publication Data
US 2023/0345207 A1 Oct. 26, 2023

Related U.S. Application Data

(60) Provisional application No. 63/323,555, filed on Mar. 25, 2022.

(51) Int. Cl.
*H04W 4/029* (2018.01)
*H04W 4/02* (2018.01)
*H04W 84/12* (2009.01)

(52) U.S. Cl.
CPC .......... *H04W 4/029* (2018.02); *H04W 4/023* (2013.01); *H04W 84/12* (2013.01)

(58) Field of Classification Search
CPC ..... H04W 4/029; H04W 4/023; H04W 84/12; H04W 4/33; H04W 16/20; H04W 64/00
See application file for complete search history.

(56) References Cited

U.S. PATENT DOCUMENTS

| | | | |
|---|---|---|---|
| 2006/0040670 A1* | 2/2006 | Li | H04W 40/02 455/445 |
| 2007/0103303 A1* | 5/2007 | Shoarinejad | H04W 76/40 340/572.1 |

(Continued)

OTHER PUBLICATIONS

[Online]. Android Developer Guide. https://developer.android.com/guide/topics/connectivity/wifi-rtt (Retrieved 2023, Jan. 17).

(Continued)

*Primary Examiner* — Santiago Garcia
(74) *Attorney, Agent, or Firm* — Vincent Duffy; Joseph Kolodka (57) ABSTRACT

A method for assessing viability of a WiFi fine tune measurement (FTM) based ranging protocol for enterprise-grade localization with heterogeneity across operational parameters is presented. The method includes enabling a plurality of access points to range with a plurality mobile devices handled by a plurality of users within an enterprise environment, tracking a mobile device of the plurality of mobile devices using onboard sensors as the mobile device travels within the enterprise environment, measuring a plurality of ranges with at least three access points of the plurality of access points at various points along a trajectory, and combining information related to the plurality of ranges and the trajectory to predict a range offset of the mobile device such that the mobile device itself self-calibrates all its range offsets on-demand.

8 Claims, 7 Drawing Sheets

(56) References Cited

U.S. PATENT DOCUMENTS

| | | | | |
|---|---|---|---|---|
| 2013/0051255 | A1* | 2/2013 | Estevez | H04B 17/11 |
| | | | | 370/252 |
| 2013/0324154 | A1* | 12/2013 | Raghupathy | H04W 4/025 |
| | | | | 455/456.1 |
| 2014/0365488 | A1* | 12/2014 | Arslan | H04W 64/00 |
| | | | | 707/736 |
| 2015/0085836 | A1* | 3/2015 | Kang | H04W 74/0808 |
| | | | | 370/336 |
| 2015/0189476 | A1* | 7/2015 | Tanaka | H04W 64/006 |
| | | | | 455/457 |
| 2015/0237471 | A1* | 8/2015 | Li | G01S 5/02521 |
| | | | | 455/456.2 |
| 2016/0088440 | A1* | 3/2016 | Palanki | G01S 5/0249 |
| | | | | 455/456.1 |
| 2018/0103352 | A1* | 4/2018 | Murase | H04W 4/33 |
| 2019/0013978 | A1* | 1/2019 | Zhou | H04L 1/0006 |
| 2019/0364380 | A1* | 11/2019 | Khawand | H04B 17/318 |
| 2020/0271747 | A1* | 8/2020 | Wu | G01P 15/18 |
| 2020/0336872 | A1* | 10/2020 | Basu Mallick | H04W 4/029 |
| 2021/0111782 | A1* | 4/2021 | Kim | H04B 7/088 |
| 2022/0070607 | A1* | 3/2022 | Ebner | H04W 4/33 |
| 2022/0201437 | A1* | 6/2022 | Sanchez | H04W 4/40 |
| 2022/0217749 | A1* | 7/2022 | Yu | H04W 72/20 |
| 2023/0081472 | A1* | 3/2023 | Wang | H04W 4/029 |
| | | | | 340/539.12 |
| 2023/0131322 | A1* | 4/2023 | Huang | H04B 7/022 |
| | | | | 370/329 |
| 2023/0176206 | A1* | 6/2023 | Skoglar | H04W 4/029 |
| | | | | 455/456.1 |

OTHER PUBLICATIONS

Banin, L., Bar-Shalom, O., Dvorecki, N., & Amizur, Y. (2018, Dec. 17). Scalable Wi-Fi client self-positioning using cooperative FTM-sensors. IEEE Transactions on Instrumentation and Measurement, 68(10), 3686-3698.

Ibrahim, M., Liu, H., Jawahar, M., Nguyen, V., Gruteser, M., Howard, R., . . . & Bai, F. (2018, Oct. 15). Verification: Accuracy evaluation of WiFi fine time measurements on an open platform. In Proceedings of the 24th Annual International Conference on Mobile Computing and Networking (pp. 417-427).

Ibrahim, M., Rostami, A., Yu, B., Liu, H., Jawahar, M., Nguyen, V., . . . & Howard, R. (2020, Jun. 15). Wi-go: accurate and scalable vehicle positioning using wifi fine timing measurement. In Proceedings of the 18th International Conference on Mobile Systems, Applications, and Services (pp. 312-324).

Rea, M., Giustiniano, D., & Widmer, J. (Dec. 10, 2020). Virtual inertial sensors with fine time measurements. In 2020 IEEE 17th International Conference on Mobile Ad Hoc and Sensor Systems (MASS) (pp. 658-665). IEEE.

Shao, W., Luo, H., Zhao, F., Tian, H., Yan, S., & Crivello, A. (2020, May 4). Accurate indoor positioning using temporal-spatial constraints based on Wi-Fi fine time measurements. IEEE Internet of Things Journal, 7(11), 11006-11019.

* cited by examiner

FIG. 1

| Category | Public Action | Dialog Token | Follow-up Dialog Token | TOD | TOA |
|---|---|---|---|---|---|
| 1 | 1 | 1 | 1 | 6 | 6 |

210

| ToD Error | ToA Error | LCI Report (Optional) | Location Civic Report (Optional) | FTM Parameters (Optional) | FTM Sync. (Optional) |
|---|---|---|---|---|---|
| 2 | 2 | Variable | Variable | Variable | Variable |

220

Octets

Linear Solver

$$\left(x_C + \sum_{i=1}^{T} d_i \cos(\alpha_i)\right)^2 + \left(y_C + \sum_{i=1}^{T} d_i \sin(\alpha_i)\right)^2 = (R_p - \delta)^2$$

854

Quadratic Solver

$$\sqrt{\left(x_{AP} - \sum_{i=1}^{T} d_i \cos(\alpha_i)\right)^2 + \left(y_{AP} - \sum_{i=1}^{T} d_i \sin(\alpha_i)\right)^2} = R_p - \delta$$

856

Range Offset

$$\delta = R_1 - \sqrt{x_{AP}^2 + y_{AP}^2}$$

REALIZING ENTERPRISE-GRADE LOCALIZATION USING WiFi 802.11mc FINE TUNE MEASUREMENT

RELATED APPLICATION INFORMATION

This application claims priority to Provisional Application No. 63/323,555, filed on Mar. 25, 2022, the contents of which are incorporated herein by reference in their entirety.

BACKGROUND

Technical Field

The present invention relates to WiFi localization solutions and, more particularly, to realizing an enterprise-grade localization using an 802.11mc fine tuning measurement.

Description of the Related Art

WiFi localization solutions received a significant boost with the introduction of the Fine Time Measurement (FTM) ranging protocol in the IEEE 802.11-2016 standard (that is, the 802.11mc standard). The ability to orchestrate WiFi ranging (distance measurement between two devices through FTM) from user-space on commercial off-the-shelf devices has opened the door for third-party service providers to develop enterprise-grade solutions that leverage pre-deployed infrastructure (e.g., WiFi access points (APs)) and end-user devices like smartphones and tablets, to localize both humans and assets in large indoor spaces. Unlike other evolving radio frequency (RF) technologies like Ultra-Wide Band (UWB) that also offer ranging capability, WiFi devices are omnipresent, have a larger coverage area and better penetrability (lower operating frequency and higher power than UWBs), making WiFi FTM more convenient and practical for enterprise-grade indoor solutions. Further, most modern devices already implement WiFi FTM.

SUMMARY

A method for assessing viability of a WiFi fine tune measurement (FTM) based ranging protocol for enterprise-grade localization with heterogeneity across operational parameters is presented. The method includes enabling a plurality of access points to range with a plurality mobile devices handled by a plurality of users within an enterprise environment, tracking a mobile device of the plurality of mobile devices using onboard sensors as the mobile device travels within the enterprise environment, measuring a plurality of ranges with at least three access points of the plurality of access points at various points along a trajectory, and combining information related to the plurality of ranges and the trajectory to predict a range offset of the mobile device such that the mobile device itself self-calibrates all its range offsets on-demand.

A non-transitory computer-readable storage medium comprising a computer-readable program for assessing viability of a WiFi fine tune measurement (FTM) based ranging protocol for enterprise-grade localization with heterogeneity across operational parameters is presented. The computer-readable program when executed on a computer causes the computer to perform the steps of enabling a plurality of access points to range with a plurality mobile devices handled by a plurality of users within an enterprise environment, tracking a mobile device of the plurality of mobile devices using onboard sensors as the mobile device travels within the enterprise environment, measuring a plurality of ranges with at least three access points of the plurality of access points at various points along a trajectory, and combining information related to the plurality of ranges and the trajectory to predict a range offset of the mobile device such that the mobile device itself self-calibrates all its range offsets on-demand.

A system for assessing viability of a WiFi fine tune measurement (FTM) based ranging protocol for enterprise-grade localization with heterogeneity across operational parameters is presented. The system includes a plurality of access points ranging with a plurality mobile devices handled by a plurality of users within an enterprise environment for tracking a mobile device of the plurality of mobile devices using onboard sensors as the mobile device travels within the enterprise environment, measuring a plurality of ranges with at least three access points of the plurality of access points at various points along a trajectory, and combining information related to the plurality of ranges and the trajectory to predict a range offset of the mobile device such that the mobile device itself self-calibrates all its range offsets on-demand.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The WiFi consortium envisions a larger scope and ecosystem for location-aware WiFi services under the umbrella of WiFi-aware networking. However, to date, there have not been compelling commercial solutions that leverage WiFi Fine Tune Measurement (FTM) for localization. Consequently, it is not clear whether WiFi FTM is ready for prime-time localization at an enterprise-scale.

Previous works have conducted experimental studies to understand WiFi FTM in indoor environments. Being preliminary in nature, WiFi FTM has largely focused on its ranging accuracy in limited experimental settings between homogeneous WiFi devices (with similar Intel WiFi network interface cards (NICs)). To establish FTM's viability in delivering a practical localization solution, the ability of its ranging primitive needs to be understood to inter-operate seamlessly and accurately with heterogeneous devices, lest there can be no "enterprise-grade" solution. To this end, the exemplary methods present one of the first comprehensive experimental studies that puts the spotlight on heterogeneity in multiple dimensions (device, spectrum, environment) in answering this question.

The extensive measurement study conducted employs multiple off-the-shelf commercial devices (e.g., 6 WiFi access points (APs) and 3 WiFi clients from different vendors) under different spectrum (ranging bandwidth and channel) and environmental (line of sight (LoS) vs. near line of sight (NLoS); cluttered vs. open indoor settings) conditions.

The key inferences from the study include:

FTM ranging suffers from fixed (independent of the AP-client distance) range offsets that vary significantly for different AP client pairs.

The range offsets for a given AP-client pair can vary substantially across different ranging channels (up to 3.6 m) and channel bandwidths (up to 16.2 m).

Ranging errors are largely amplified in NLOS conditions. Additionally, unlike in LOS conditions, wider channels in NLoS conditions do not always yield more accurate ranges.

While the presence of fixed offsets in estimated ranges was observed before, their reasons were unknown and offsets were addressed through a-priori calibration between a fixed set of devices. However, the present extensive study was conducted across multiple dimensions and has exposed the scale and impact of these offsets, while also shedding light on their potential causes. It is found that to compensate for the impact of wireless multi-path and direct-path detection delays, device vendors employ proprietary compensation algorithms. Indeed, there is room in the standard for vendors to advertise for such compensation. While a common vendor for the AP and client can have a synergistic compensation algorithm, this is not possible to address and scale across vendors, resulting in offsets that range from −12 m to 14 m, resulting in localization errors as large as 20 m. Indeed, this poses a fundamental issue in leveraging FTM for practical localization in enterprises, since these offsets cannot be pre-calibrated and accounted for.

This points to the conclusion that WiFi FTM is not ready for prime-time enterprise-scale localization.

However, albeit such unfortunate result, it is believed that the door for leveraging FTM is not completely closed. As a remedy, the exemplary embodiments propose a simple but effective over-the-top (OTT) auto-calibration solution that allows every WiFi device, when it enters an enterprise environment, to self-calibrate its offsets, rendering WiFi FTM useful for localization. The exemplary approach follows the notion of simultaneous localization and calibration, whereby the mobility of the client device is used to measure multiple ranges to the AP at different points on the client's trajectory, which are then combined with its own mobility (informed by its inertial sensors) to jointly solve for its own location, while compensating for the unknown offsets. This solution can be easily deployed as an Android or iOS application on client devices, enabling seamless integration.

The contributions include an extensive measurement study of WiFi FTM conducted to assess its practical viability for enterprise-grade localization, with heterogeneity across various operational parameters as the focus. The exemplary embodiments propose WiLoc, an OTT auto-calibration solution to remedy the fundamental challenge in inaccurate range estimations, demonstrating that it is still possible to deliver useful localization (median accuracy of ~2 m) with WiFi FTM, notwithstanding its large range offsets.

The exemplary work is the first to explore the shortcomings of WiFi FTM in broader enterprise settings and discuss a remedy toward a practical localization solution.

The IEEE 802.11mc FTM ranging protocol enables two WiFi devices with asynchronous clocks to cooperatively estimate the distance between themselves by measuring a Round Trip Time (RTT). To measure the RTT, a station (the initiator 110) and an AP (the responder 120) exchange bursts of messages with each other, as shown in the diagram 100 of FIG. 1.

Figure 1:
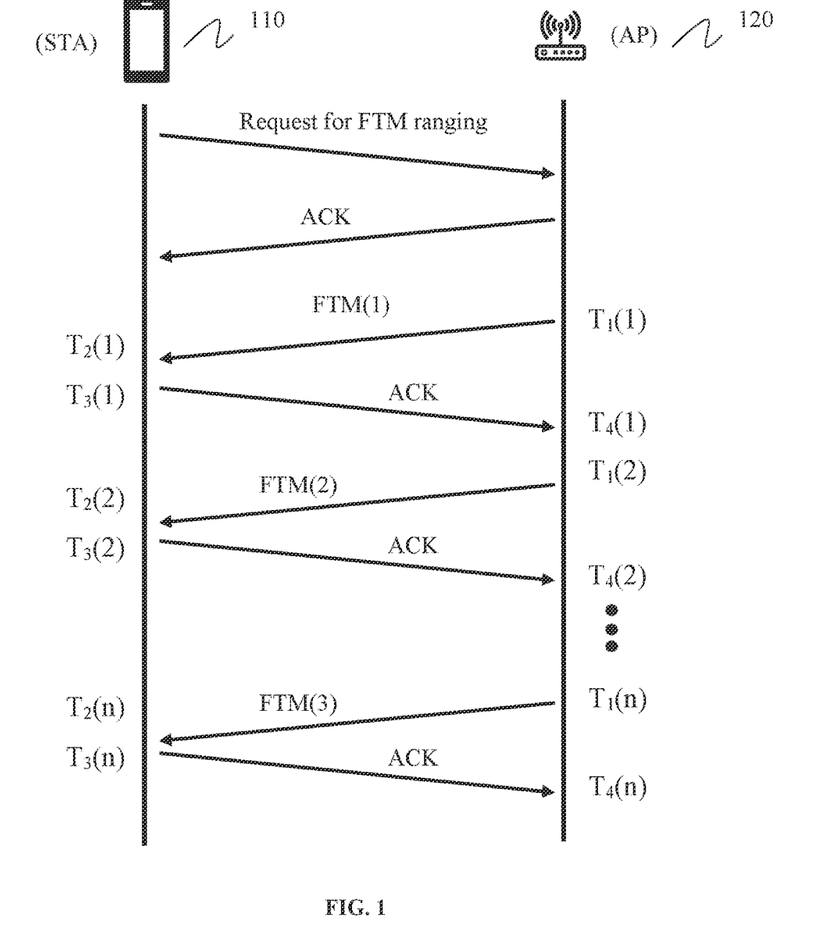
FIG. 1 is a block/flow diagram of an exemplary fine tune measurement (FTM) ranging protocol message sequence.

Both the STA 110 and the AP 120 record the Time-of-Departure (ToD), e.g., $T_1(k)$, $T_3(k)$ in FIG. 1, and Time-of-Arrival (ToA), e.g., $T_2(k)$, $T_4(k)$, for the sent and received FTM messages, respectively.

Thereafter, the RTT (for k bursts) is calculated as follows:

$$RTT = 1/k\left[\left(\sum_{n=1}^{k}T_4(n) - \sum_{n=1}^{k}T_1(n)\right) - \left(\sum_{n=1}^{k}T_3(n) - \sum_{n=1}^{k}T_2(n)\right)\right]$$

Once RTT is calculated, distance can be computed as $D=\frac{1}{2}*RTT*C$, where C is the speed of light.

The success of the FTM ranging protocol lies in the nodes' ability to accurately record the ToA and ToD. However, in practice, an implementation may capture the ToD earlier or later than when the signal arrives at the transmit antenna connector resulting in an offset. Similarly, a significant amount of time can elapse from when the preamble arrives at the receive antenna (actual ToA) to when the node detects the frame, synchronizes with its logical structure, and computes the ToA. The standard requires devices to compensate for this delay in ToA computation by subtracting an offset from the computed ToA. However, the standard does not provide any guidance on how exactly this offset should be determined leading vendors to implement their own proprietary algorithms to correct the ToA/TOD estimations that often leads to over-or-under compensation resulting in either an inflated or a deflated range. The problem is further exacerbated when two different vendors' devices interact, with each device's (incorrect) ToA/ToD estimations (disproportionally) contributing to the eventual range offset.

Figure 2:
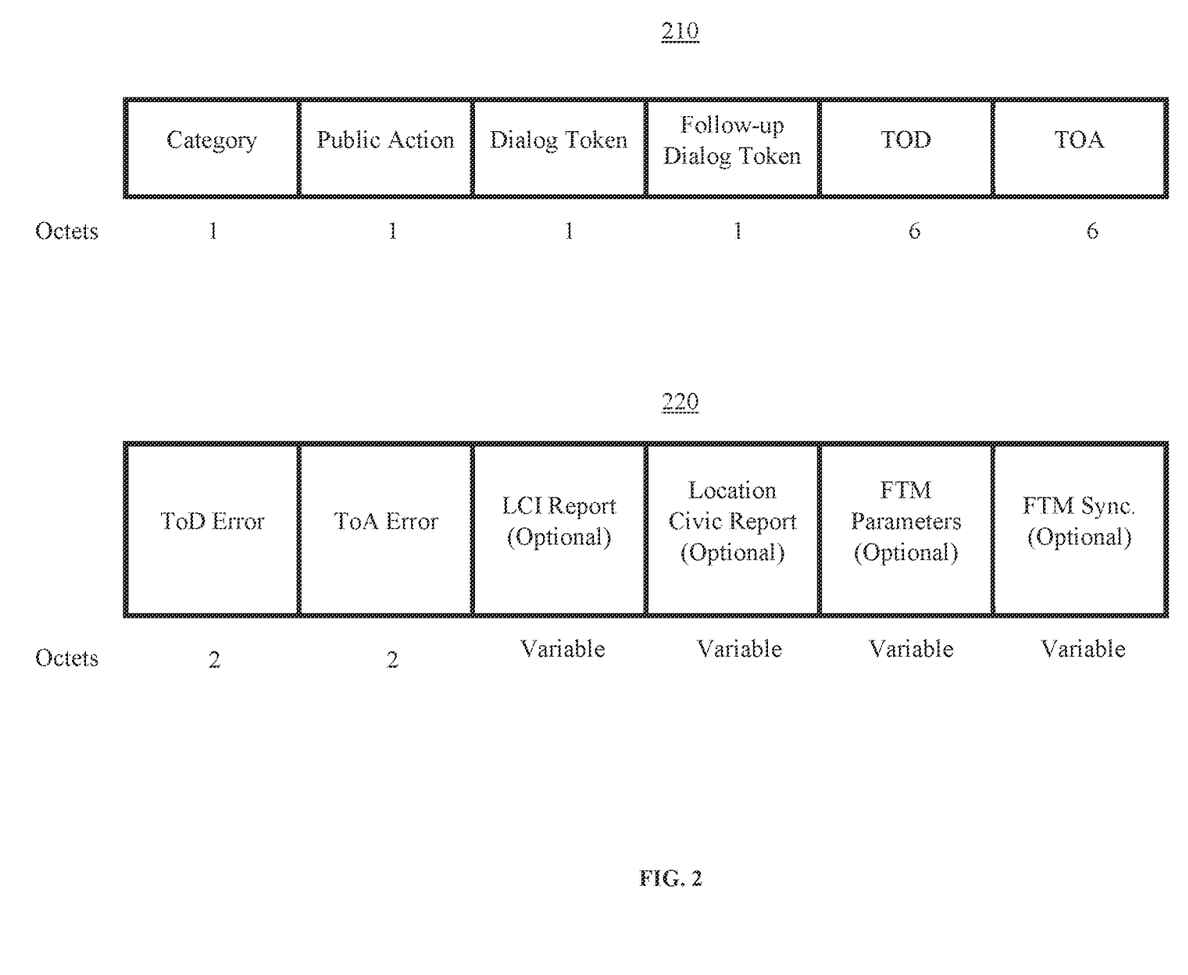
FIG. 2 is a block/flow diagram of an exemplary FTM frame format.

The 802.11mc frame has specific fields for devices (both STAs and APs) to indicate to their ranging peer any potential error in ToA and ToD estimations (ToA Error, ToD Error fields, as shown in FIG. 2; elements 210, 220). The standard provides this option to precisely capture a device's confidence in offset-prediction. However, in the measurement study, it was found that none of the commercial devices actually use these options.

Interestingly, it is observed that the range offsets for a pair of devices is constant for a particular central frequency (channel) and channel bandwidth (e.g., 20/40/80 MHz) combination used during the FTM protocol. It is believed that the devices use constant offset values depending on the channel and bandwidth employed (to account for the difference in processing overheads in wider channels) to compensate for the incorrect ToA/ToD estimations. To understand the scale of the range offsets problem, a detailed measurement study with multiple off-the-shelf devices was conducted.

A measurement study conducted utilizes 6 different WiFi APs—ASUS RTACRH13, Linksys Velop, Google Nest's Mesh AP system (consisting of three APs in a mesh network, which can be referred to as Google 1, Google 2 and Google 3) and a Compulab Fitlet AP, and 3 different STAs, that is, Google Pixel 5, Xiaomi Mi Note 10, and a Compulab Fitlet acting as a STA. The WiFi chipsets employed by each of these devices are different from each other and all devices support channel widths up to 80 MHz. Note that certain vendors (e.g., Google®) do not allow manual channel and bandwidth selection. Hence, for these devices, only the channel and bandwidth configuration chosen by the device for FTM ranging are employed.

Regarding data collection, to enable seamless FTM ranging on Fitlet devices, the Linux OS's iw utility was modified using a patch. For Android smartphones, an app that uses the WiFi Ranging Android API was written to send FTM requests periodically (e.g., every 30 ms). Data was collected in both LoS and NLOS scenarios, in diverse indoor environments inside an office building and a university campus: a large, carpeted area, a lab with benches and equipment, a building lobby with furniture, and a large empty open area with tall glass windows.

Regarding LoS conditions, the WiFi FTM ranging performance with static STAs in LoS scenarios was evaluated. For each AP-STA pair, a static STA was placed at various distances from 1 m to 50 m, and the FTM ranges were recorded for a channel and bandwidth (channel 36/80 MHz) that is supported by all the AP-STA pairs. The true distance between the client and the AP for Ground Truth (GT) was physically measured. The GT range was used to calculate the range offsets. Two observations were made, that is, there is a fixed range offset, independent of the distance between the AP and the STA and range offsets vary significantly for different AP-client pairs, thus showing how extreme and disparate the offset problem is across heterogeneous devices.

Regarding the impact of the operating frequency, it was then evaluated how range offsets vary based on the operating channel (for a fixed channel bandwidth). It is observed that devices implement a frequency dependent offset (for ToA/ToD correction). However, the variance in these offsets for a given AP-client pair is not very large. The maximum offset difference across different channels, observed with a Xiaomi client and ASUS AP, is 3.6 m.

Regarding the impact of the channel bandwidth, it was shown how range offsets vary for different channel bandwidths (same central frequency), for a given AP-STA pair. The range offsets for the same pair of devices can vary by as much as 16.2 m (for ASUS AP-Fitlet Client) or as little as 1.2 m (for Fitlet AP-Pixel 5 Client).

Regarding the accuracy of the FTM ranges with offset correction, the accuracy of the FTM ranges, with (manual) offset correction was evaluated. For the data previously collected, the offset is estimated as the mean difference between the measured range and the GT range and that is used as the offset value. Subtracting this offset from the measured range gives the range error. It is observed that across device pairs, in the median case, the range errors are ~50 cm, ~30 cm, and ~10 cm, suggesting that FTM ranges in LoS are highly accurate and can aid in accurate localization, provided that the disparate range offsets are resolved.

Regarding NLOS conditions, the FTM ranging accuracy in NLoS conditions was evaluated. To determine the FTM ranging errors, the range offset is manually discounted, which is calculated from the LoS measurements, from the measured range, and the accuracy of the measured ranges. Unlike in LoS, the range errors (for a given channel and bandwidth) are amplified in NLoS conditions. The drop in channel quality, combined with the devices' inability to exactly identify the Channel Impulse Response peaks (a common issue for multipath signals) further degrades the ToA estimations leading to large range errors. The 80 MHz channel bandwidth, which had the most accurate range estimations in LoS, suffers the most in NLOS due to fact that a signal using wider bandwidth (e.g., 80 MHz) attenuates faster than the same signal spread over a narrower bandwidth (e.g., 20 MHz). More importantly, it was determined that for localization solutions implementing FTM ranging, a wider channel does not always yield accurate ranges.

Regarding LoS versus NLOS FTM ranging, and the impact on localization, given the high inaccuracy of NLOS range estimations, any localization system that uses FTM ranges needs to be able to distinguish LoS ranges from NLOS ranges, so that it can filter out the NLOS ranges.

To make that classification, a simple machine learning model is employed, such as Random Forest, and three inputs are used, that is, last n ranges, last n RSSI values, and variance in last n ranges. The exemplary methods attempt to accurately classify whether the ranges are with an AP in LoS or NLoS. Even using only 5 range samples obtained every 30 ms, the model can correctly classify LoS and NLOS ranges in 83.5% of the cases. Furthermore, assuming the user stays in LoS/NLOS for longer, taking a larger number of range/RSSI samples spaced further apart leads to even higher accuracy, up to 99.5% when considering the previous 20 range/RSSI values obtained every second.

To summarize, it was determined that the range offsets depend on the AP-STA pair, the channel width, and the channel (frequency). Given the plethora of different vendors for WiFi devices and the fact that the devices' spectrum configurations change frequently, it becomes practically impossible to have an offline solution to this problem. The only way to address this challenge is via an on-demand, real-time, online solution.

In addition, the ranging accuracy deteriorates significantly as the user moves from LoS to NLoS conditions. Thus, it becomes important to design a system that can distinguish between LOS and NLOS ranges, so that it can filter out the NLOS ranges and use only the LoS ranges.

To address the range offset problem in a practical manner, the exemplary methods propose WiLoc, a novel over-the-top (OTT) solution that can be deployed as an application on end-user devices like smartphones and that enables these devices to self-calibrate their range offsets with multiple APs when they enter an enterprise environment, without any human input. At a high level, WiLoc follows the notion of simultaneous localization and calibration. WiLoc employs Euclidean geometry leveraging the user's mobility, computed using onboard inertial sensors, to measure the ranges at various points of its trajectory and combines both trajectory and range information to solve for the range offset.

WiLoc 300 assumes an AP 310 to be statically placed at $(x_{AP}, y_{AP})$, (FIG. 3), and the user to start at $(x_C, y_C)$ and move continuously in a random direction with respect to the AP 310. At each time-interval: t (e.g., t=1 s), the STA 320 performs FTM ranging to measure a range $R_p$, where $R_p = r_p + \delta$ with $\delta$ being the range offset. To solve for $\delta$, WiLoc 300 employs two approaches, that is, WiLoc$_{lin}$ and WiLoc- $quad$. While WiLoc$_{lin}$ uses a system of linear equations to solve for δ, WiLoc$_{quad}$ employs a quadratic solver. The linear approach is less complex, but results in a less accurate estimation of δ, while the quadratic approach is more complex, but offers more accurate estimation.

Figure 4:
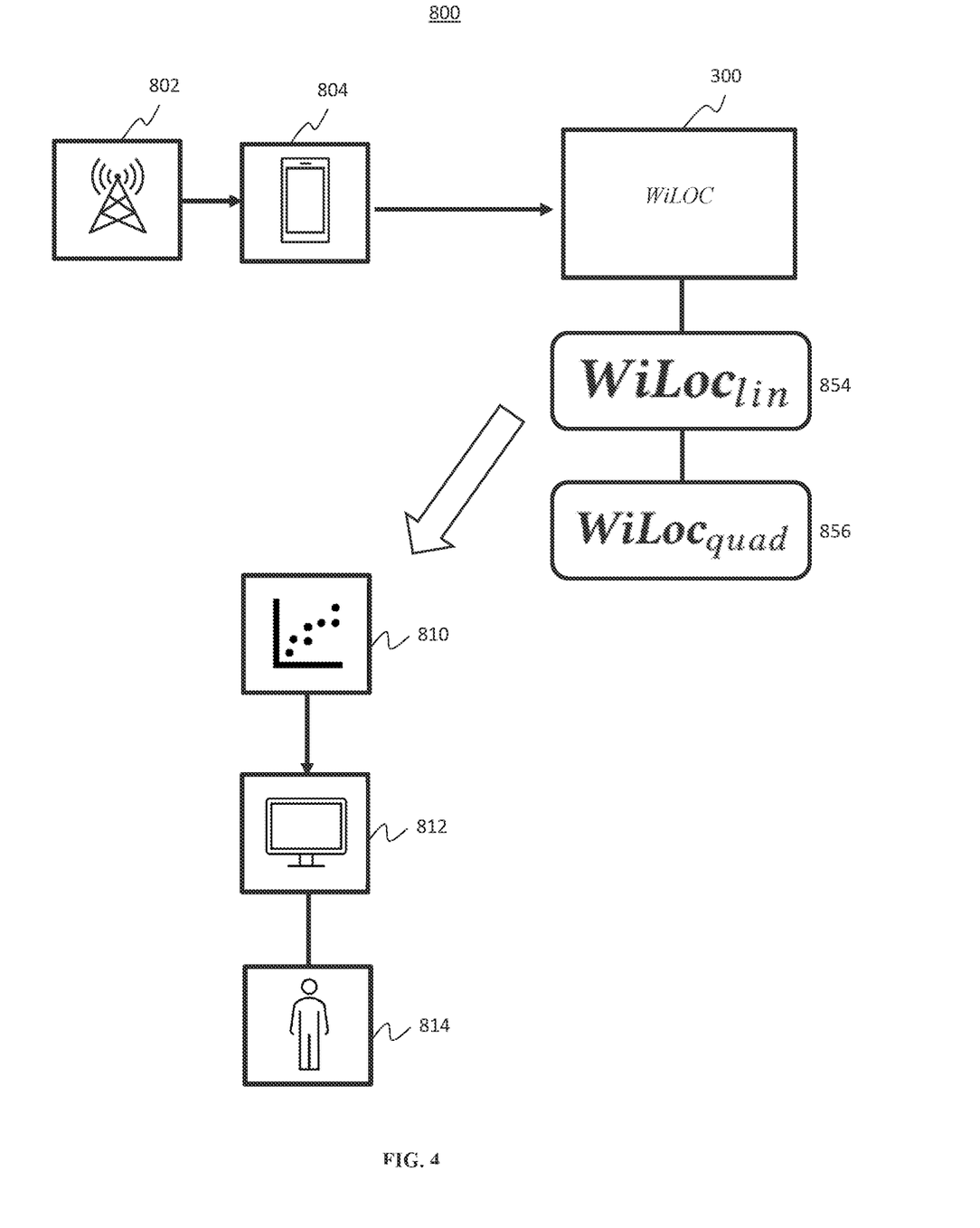
FIG. 4 is an exemplary practical application for assessing viability of a WiFi FTM based ranging protocol for enterprise-grade localization with heterogeneity across operational parameters, in accordance with embodiments of the present invention.

The first approach, WiLoc$_{lin}$ (854; FIG. 4), formulates the problem of solving for δ using a series of linear equations. WiLoc$_{lin}$ assumes $(x_{AP}, y_{AP})=(0,0)$ for the AP location.

Given the STA's initial position $(x_C, y_C)$:

$$x_C^2 + y_C^2 = (R_1 - \delta)^2 \tag{1}$$

Figure 3:
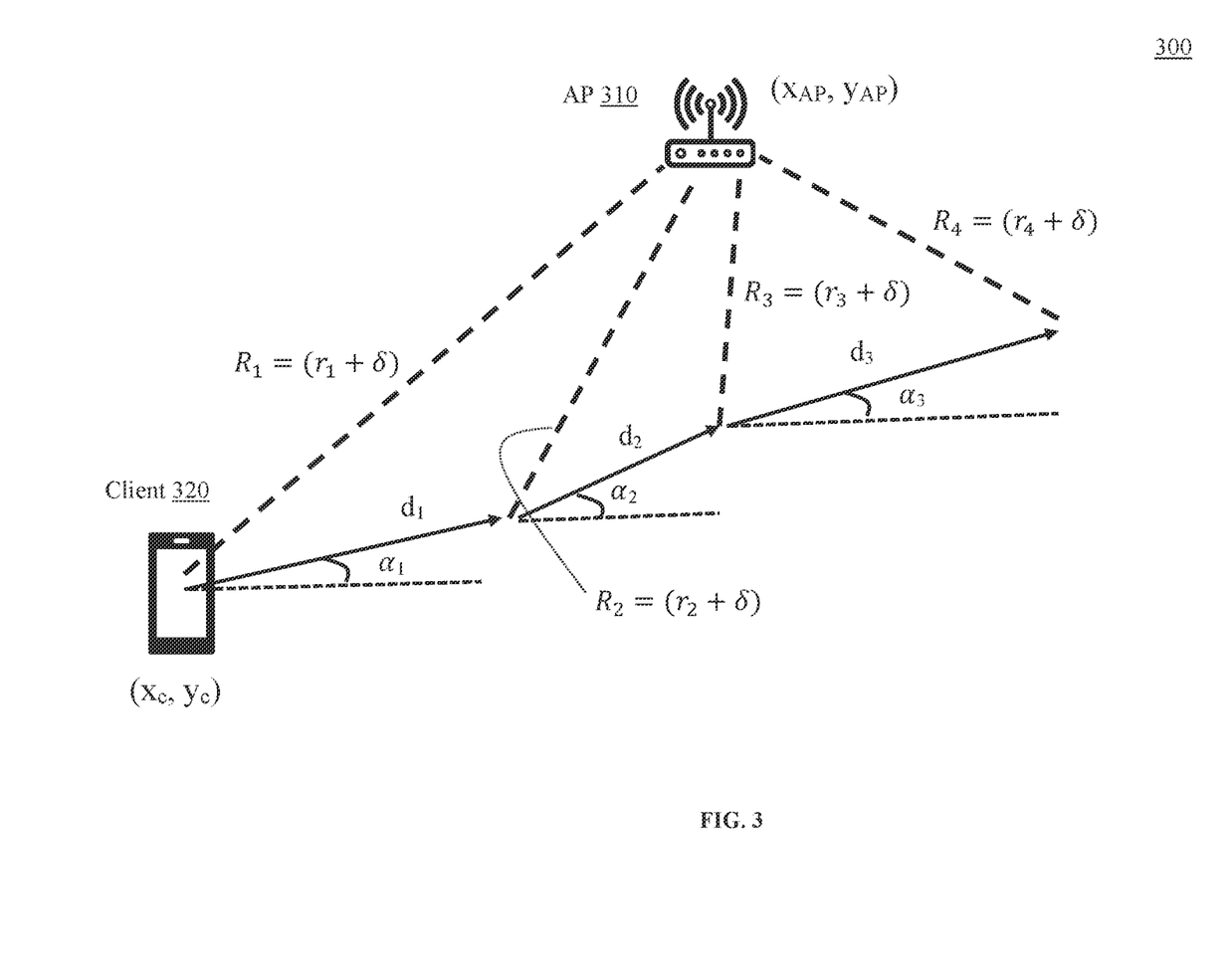
FIG. 3 is a block/flow diagram of an exemplary WiLoc scenario, in accordance with embodiments of the present invention.

As the user moves, at each time interval t, the STA 320 reaches a new position p, resulting in an additional equation:

$$\left(x_C + \sum_{i=1}^{T} d_i \cos(\alpha_i)\right)^2 + \left(y_C + \sum_{i=1}^{T} d_i \sin(\alpha_i)\right)^2 = (R_p - \delta)^2 \tag{2}$$

where, $\alpha_i$ is computed by measuring the heading (magnetometer) information, and $d_i$ (displacement) is estimated via the STA's inertial sensors (accelerometer, magnetometer).

Now, for each new equation (2) obtained at every time interval t, the exemplary methods subtract equation (1) from it. This linearizes the system of equations with three unknown variables ($x_C$, $y_C$, and δ). Solving for the three unknowns requires at-least three equations (3 seconds if t=1), with additional equations increasing the accuracy of the solution (δ)

The second approach, WiLoc$_{quad}$ (856; FIG. 4), employs a quadratic solver.

WiLoc$_{quad}$ assumes $(x_C, y_C)=(0,0)$ for the STA's initial position and given the AP is at $(x_{AP}, y_{AP})$, the Euclidean distance between the AP and STA is given as:

$$\sqrt{x_{AP}^2 + y_{AP}^2} = R_1 - \delta \tag{3}$$

At each time t, with the user at position p, the new Euclidean distance is:

$$\sqrt{\left(x_{AP} - \sum_{i=1}^{T} d_i \cos(\alpha_i)\right)^2 + \left(y_{AP} - \sum_{i=1}^{T} d_i \sin(\alpha_i)\right)^2} = R_p - \delta \tag{4}$$

For each new equation (4) at every time interval t, the exemplary methods subtract equation (3) from it (i.e., (4)-(3)). This cancels out δ leaving 2 unknowns, i.e., $x_{AP}$ and $y_{AP}$. WiLoc$_{quad}$ requires only two equations to solve for the unknowns, with additional equations increasing the accuracy of the solution.

Once WiLoc$_{quad}$ solves for $x_{AP}$ and $y_{AP}$, the range-offset δ is given by:

$$\delta = R_1 - \sqrt{x_{AP}^2 + y_{AP}^2} \tag{5}$$

where $R_1$ is the range when the user (STA) was at (0,0).

WiLoc 300 schedules a STA to sequentially range with multiple APs (at least 3) at each time interval t and solves for dap to compute the true range from each AP. LOS APs are selected by the Random Forest classifier. Subsequently, WiLoc 300 employs a simple least-square multilateration solver to localize the STA, with the offset-corrected ranges from LoS APs as input to the solver.

In conclusion, WiFi's fine time measurement (FTM) based ranging protocol has set the stage for mass adoption of location aware applications and services in WiFi-pervading enterprise and consumer ecosystems. However, the lack of deployment of such commercial-scale localization solutions has motivated the execution of a comprehensive experimental study that aims to verify whether WiFi's FTM is indeed ready for prime-time localization.

With heterogeneity in operation (devices, environments, and spectrum) being the fundamental essence of commercial deployments, the exemplary study focuses on FTM's ability to deliver useable localization under such practical conditions. Being a first of its kind, the exemplary study reveals several interesting insights for practical operation of FTM, with the most interesting of them being its inability to eliminate substantial offsets in estimated ranges between heterogeneous devices and configurations that degrade performance significantly (up to 20 m error). Albeit such unfortunate result for FTM's readiness, the exemplary methods also propose a simple but promising remedy, that is, an over-the-top autocalibration solution that allows every WiFi device, when it enters an enterprise environment, to self-calibrate its offsets on-demand, thereby salvaging FTM to render it useful (median error of 2 m) for localization.

FIG. 4 is a block/flow diagram 800 of a practical application for assessing viability of a WiFi fine tune measurement (FTM) based ranging protocol for enterprise-grade localization with heterogeneity across operational parameters, in accordance with embodiments of the present invention.

In one practical example, a transmitter 802 is in communication with a receiver 804, and WiLoc 300 is implemented in an enterprise environment via either WiLoc$_{lin}$ (854) or WiLoc quad (856). The results 810 (e.g., variables or parameters or factors or communications) can be provided or displayed on a user interface 812 handled by a user 814.

Regarding the practical applications of the exemplary embodiments, the novelty of 5G is the integration of multiple networks serving diverse sectors, domains and applications, such as multimedia, virtual reality (VR) and augmented reality (AR), machine to machine (M2M) and internet of things (IoT), automotive applications, smart city, etc. The diversity of the 5G applications and their related service requirements in terms of data rate, latency, reliability, and other parameters leads to the necessity for operators to provide a diverse set of 5G networks.

Among the various innovations enabling 5G, one of main necessities and realities is the use of mmWave spectrum be coupled with network densification and massive multiple input, multiple output (MIMO) to serve as an ultra-high-speed access and backhaul systems. A key ingredient for 5G is to enable applications in the mmWave spectrum, such as mobile edge computing (MEC), which is expected to bring information and processing closer to the mobile users and enable ultra-high speed and low latency communications. The exemplary embodiments of the present invention can allow such applications to be successfully implemented.

Figure 5:
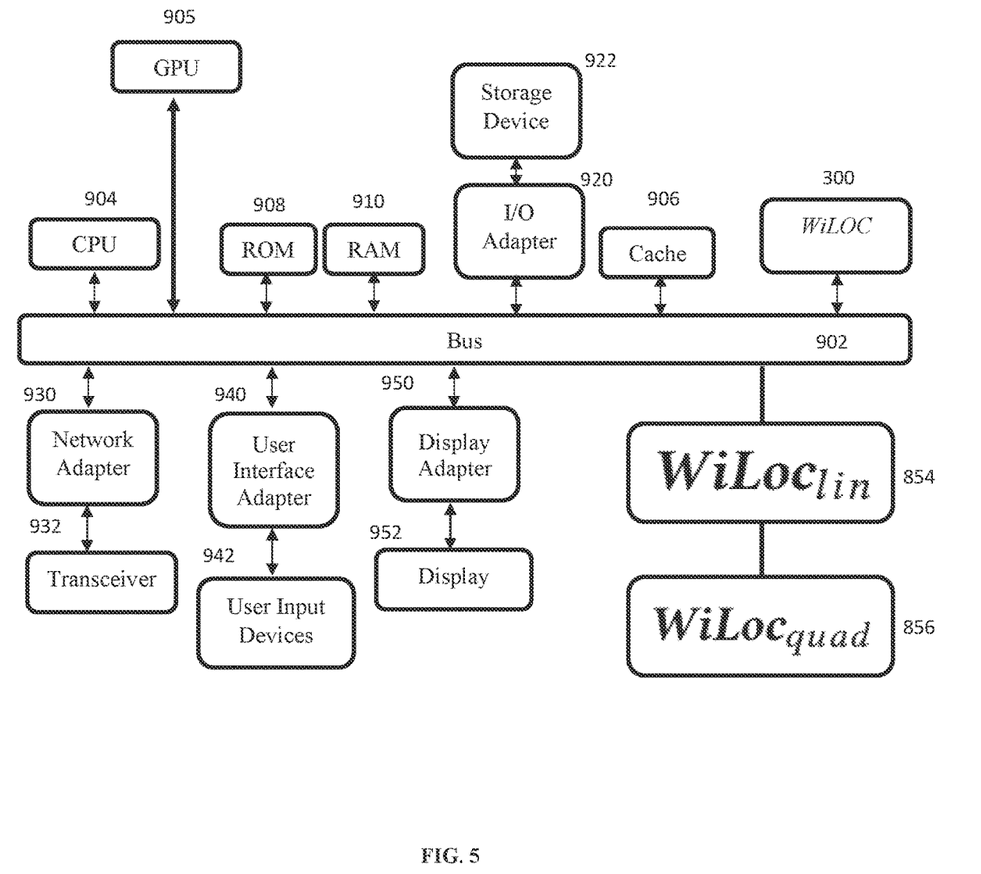
FIG. 5 is an exemplary processing system for assessing viability of a WiFi FTM based ranging protocol for enterprise-grade localization with heterogeneity across operational parameters, in accordance with embodiments of the present invention.

FIG. 5 is an exemplary processing system for assessing viability of a WiFi fine tune measurement (FTM) based ranging protocol for enterprise-grade localization with heterogeneity across operational parameters, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, WiLOC 300 can be implemented by either using a linear solver 854 (WiLoc$_{lin}$) or a quadratic solver 856 (WiLoc$_{quad}$).

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
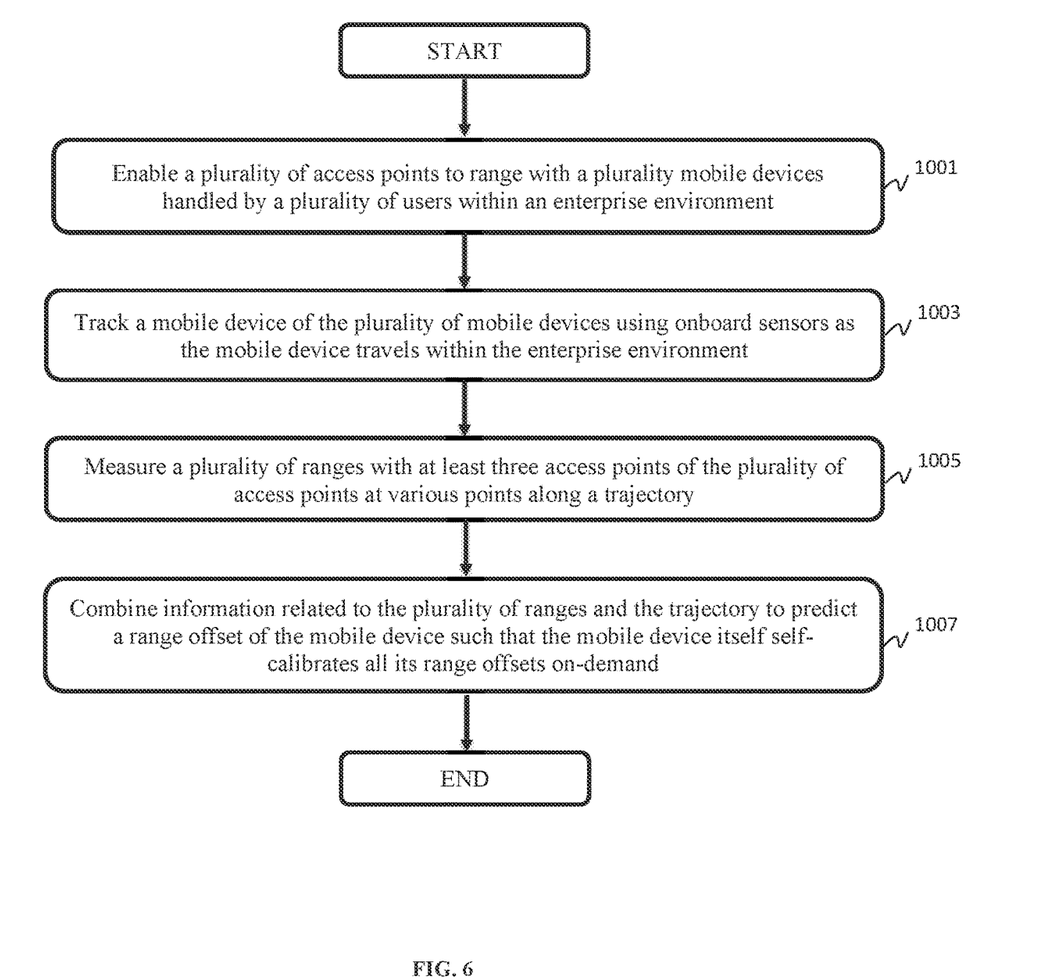
FIG. 6 is a block/flow diagram of an exemplary method for assessing viability of a WiFi FTM based ranging protocol for enterprise-grade localization with heterogeneity across operational parameters, in accordance with embodiments of the present invention.

FIG. 6 is a block/flow diagram of an exemplary method for assessing viability of a WiFi fine tune measurement (FTM) based ranging protocol for enterprise-grade localization with heterogeneity across operational parameters, in accordance with embodiments of the present invention.

At block 1001, enable an access point to communicate with a plurality mobile devices handled by a plurality of users within an enterprise environment.

At block 1003, track a mobile device of the plurality of mobile devices as the mobile device travels along a trajectory within the enterprise environment.

At block 1005, measure a plurality of ranges at various points along the trajectory.

At block 1007, combine information related to the plurality of ranges and the trajectory to predict a range offset of the mobile device such that the mobile device itself self-calibrates all its range offsets on-demand.

Figure 7:
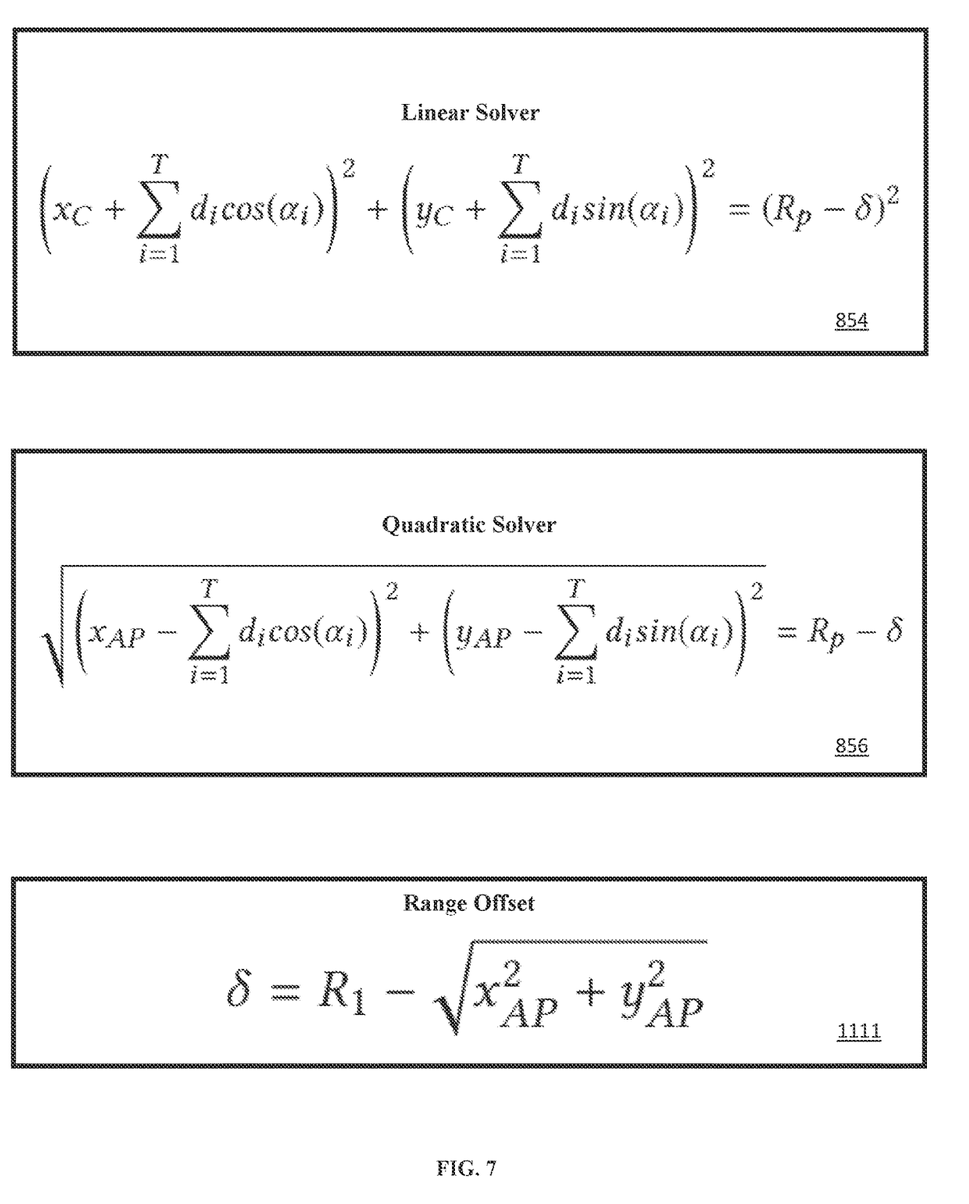
FIG. 7 is a block/flow diagram of exemplary equations for a linear solver and a quadratic solver, as well as for a range offset, in accordance with embodiments of the present invention.

FIG. 7 is a block/flow diagram of exemplary equations for a linear solver and a quadratic solver, as well as for a rage offset, in accordance with embodiments of the present invention.

WiLOC 300 can be implemented by either using a linear solver 854 (WiLoc$_{lin}$) or a quadratic solver 856 (WiLoc$_{quad}$). The range offset equation for the quadratic solver 856 (WiLoc$_{quad}$) is given as 1111.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for assessing viability of a WiFi fine tune measurement (FTM) based ranging protocol for enterprise-grade localization with heterogeneity across operational parameters, the method comprising:
    enabling a plurality of access points to range with a plurality of mobile devices handled by a plurality of users within an enterprise environment;
    tracking a mobile device of the plurality of mobile devices using onboard sensors as the mobile device travels within the enterprise environment;
    measuring a plurality of ranges with at least three access points of the plurality of access points at various points along a trajectory; and
    combining information related to the plurality of ranges and the trajectory to predict a range offset of the mobile device such that the mobile device itself self-calibrates all its range offsets on-demand, wherein the range offset is computed by using a quadratic solver and a new position in the trajectory is reached by solving:

$$\sqrt{\left(x_{AP} - \sum_{i=1}^{T} d_i \cos(\alpha_i)\right)^2 + \left(y_{AP} - \sum_{i=1}^{T} d_i \sin(\alpha_i)\right)^2} = R_p - \delta,$$

where $\alpha_i$ is an angular displacement of the mobile device, $d_i$ is a distance traveled by the mobile device between time-intervals on the trajectory, $(x_{AP}, y_{AP})$ is an initial position of an access point, $R_p$ is a range of the plurality of ranges, and $\delta$ is the range offset.

2. The method of claim 1, wherein the mobile device of the plurality of mobile devices performs FTM ranging at a plurality of time-intervals to measure the plurality of ranges.

3. The method of claim 1, wherein the range offset is given by:

$$\delta = R_1 - \sqrt{x_{AP}^2 + y_{AP}^2},$$

where $(x_{AP}, y_{AP})$ is an initial position of the access point and $R_1$ is a range when a user of the mobile device was at position (0,0).

4. A system for assessing viability of a WiFi fine tune measurement (FTM) based ranging protocol for enterprise-grade localization with heterogeneity across operational parameters, the system comprising:
- a plurality of access points ranging with a plurality of mobile devices handled by a plurality of users within an enterprise environment for:
- tracking a mobile device of the plurality of mobile devices using onboard sensors as the mobile device travels within the enterprise environment;
- measuring a plurality of ranges with at least three access points of the plurality of access points at various points along a trajectory; and
- combining information related to the plurality of ranges and the trajectory to predict a range offset of the mobile device such that the mobile device itself self-calibrates all its range offsets on-demand, wherein the range offset is computed by using a quadratic solver and a new position in the trajectory is reached by solving:

$$\sqrt{\left(x_{AP} - \sum_{i=1}^{T} d_i \cos(\alpha_i)\right)^2 + \left(y_{AP} - \sum_{i=1}^{T} d_i \sin(\alpha_i)\right)^2} = R_p - \delta,$$

where $\alpha_i$ is an angular displacement of the mobile device, $d_i$ is a distance traveled by the mobile device between time-intervals on the trajectory, $(x_{AP}, y_{AP})$ is an initial position of an access point, $R_p$ is a range of the plurality of ranges, and $\delta$ is the range offset.

5. The system of claim 4, wherein the mobile device of the plurality of mobile devices performs FTM ranging at a plurality of time-intervals to measure the plurality of ranges.

6. A method for assessing viability of a WiFi fine tune measurement (FTM) based ranging protocol for enterprise-grade localization with heterogeneity across operational parameters, the method comprising:
- enabling a plurality of access points to range with a plurality of mobile devices handled by a plurality of users within an enterprise environment;
- tracking a mobile device of the plurality of mobile devices using onboard sensors as the mobile device travels within the enterprise environment;
- measuring a plurality of ranges with at least three access points of the plurality of access points at various points along a trajectory; and
- combining information related to the plurality of ranges and the trajectory to predict a range offset of the mobile device such that the mobile device itself self-calibrates all its range offsets on-demand, wherein the range offset is computed by using a linear solver and a new position in the trajectory is reached by solving:

$$\left(x_C + \sum_{i=1}^{T} d_i \cos(\alpha_i)\right)^2 + \left(y_C - \sum_{i=1}^{T} d_i \sin(\alpha_i)\right)^2 = (R_p - \delta)^2,$$

where $\alpha_i$ is an angular displacement of the mobile device, $d_i$ is a distance traveled by the mobile device between time-intervals on the trajectory, $(x_C, y_C)$ is an initial position of the mobile device, $R_p$ is a range of the plurality of ranges, and $\delta$ is the range offset.

7. The method of claim 6, wherein the mobile device of the plurality of mobile devices performs FTM ranging at a plurality of time-intervals to measure the plurality of ranges.

8. The method of claim 6, wherein the range offset is given by:

$$\delta = R_1 - \sqrt{x_{AP}^2 + y_{AP}^2},$$

where $(x_{AP}, y_{AP})$ is an initial position of the access point and $R_1$ is a range when a user of the mobile device was at position (0,0).

* * * * *